United States Patent
Marr et al.

(10) Patent No.: US 10,393,859 B2
(45) Date of Patent: Aug. 27, 2019

(54) SYSTEM AND METHOD FOR ADAPTIVE SIMULTANEOUS TRANSMIT AND RECEIVE LEAKAGE CANCELLATION

(71) Applicant: RAYTHEON COMPANY, Waltham, MA (US)

(72) Inventors: Harry B. Marr, Manhattan Beach, CA (US); John P. Gianvittorio, Venice, CA (US); Jeffrey Caldwell, Hermosa Beach, CA (US); Samuel E. Parker, Lakewood, CA (US); John Cangeme, Hollis, NH (US)

(73) Assignee: RAYTHEON COMPANY, Waltham, MA (US)

( * ) Notice: Subject to any disclaimer, the term of this patent is extended or adjusted under 35 U.S.C. 154(b) by 368 days.

(21) Appl. No.: 15/295,084

(22) Filed: Oct. 17, 2016

(65) Prior Publication Data

US 2018/0106884 A1    Apr. 19, 2018

(51) Int. Cl.
*G01S 7/02* (2006.01)
*G01S 7/03* (2006.01)
(Continued)

(52) U.S. Cl.
CPC .............. *G01S 7/352* (2013.01); *G01S 7/023* (2013.01); *G01S 7/038* (2013.01); *G01S 7/292* (2013.01);
(Continued)

(58) Field of Classification Search
CPC .......... G01S 7/352; G01S 7/354; G01S 7/292; G01S 7/023; G01S 7/038; G01S 2007/358
(Continued)

(56) References Cited

U.S. PATENT DOCUMENTS 4,783,660 A * 11/1988 Pierce ....................... G01S 7/28
342/101
4,968,967 A    11/1990 Stove
(Continued)

FOREIGN PATENT DOCUMENTS

WO    WO 2015/021481 A2    2/2015
WO    WO 2015/130257 A1    9/2015

OTHER PUBLICATIONS

Wikipedia article, "FIFO computing and electronics", Mar. 29, 2019 version (Year: 2019).*

(Continued)

*Primary Examiner* — Frank J McGue
(74) *Attorney, Agent, or Firm* — Lewis Roca Rothgerber Christie LLP

(57) ABSTRACT

Method and apparatus for leakage signal cancellation in a simultaneous transmit and receive RF system includes: generating a digital transmit signal for transmission from the system; receiving a receive signal produced by reflection of the transmit signal from an object or generated by a second RF system; adaptively filtering the transmit signal by an adaptive finite input response (FIR) filter; calculating filter coefficients for the adaptive FIR filter in real-time at a different sampling rate; adaptively inputting the calculated filter coefficients to the adaptive FIR filter to generate a cancellation signal in real-time; and applying the cancellation signal to the receive signal to cancel leakage in the receive signal to generate an optimum receive signal.

15 Claims, 6 Drawing Sheets

(51) Int. Cl.
*G01S 7/35* (2006.01)
*G01S 7/292* (2006.01)

(52) U.S. Cl.
CPC ......... *G01S 7/354* (2013.01); *G01S 2007/358* (2013.01)

(58) Field of Classification Search
USPC .......................................................... 342/89
See application file for complete search history.

(56) References Cited

U.S. PATENT DOCUMENTS

| | | | |
|---|---|---|---|
| 5,691,978 | A | 11/1997 | Kenworthy |
| 6,812,824 | B1 | 11/2004 | Goldinger et al. |
| 7,202,812 | B2 | 4/2007 | Krikorian et al. |
| 7,969,350 | B2 | 6/2011 | Winstead et al. |
| 9,327,043 | B2 | 5/2016 | Olchovy et al. |
| 2006/0234691 | A1* | 10/2006 | Dygert ................. H04B 1/0003 455/418 |
| 2006/0273952 | A1* | 12/2006 | Krikorian ............... G01S 7/038 342/198 |
| 2011/0096667 | A1* | 4/2011 | Arita ...................... H04L 12/44 370/237 |
| 2015/0078226 | A1 | 3/2015 | Charlon et al. |
| 2015/0146589 | A1* | 5/2015 | Webb ................... H04L 5/1461 370/282 |
| 2017/0317759 | A1* | 11/2017 | Agazzi .................. H04B 10/40 |

OTHER PUBLICATIONS

International Search Report for related International Application No. PCT/US2017/067853, filed Dec. 21, 2017, International Search Report dated Apr. 5, 2017 and mailed Apr. 12, 2018 (5 pgs.).
Written Opinion of the International Searching Authority for related International Application No. PCT/US2017/067853, filed Dec. 21, 2017, Written Opinion of the International Searching Authority dated Apr. 12, 2018 (6 pgs.).
Shynk, "Frequency-Domain and Multirate Adaptive Filtering", IEEE Signal Processing Magazine, vol. 9, No. 1 Jan. 1992 (pp. 14-37).
International Search Report for corresponding International Application No. PCT/US2017/044490, filed Jul. 28, 2017, International Search Report dated Oct. 25, 2017 and mailed Nov. 7, 2017 (5 pgs.).
Written Opinion of the International Searching Authority for corresponding International Application No. PCT/US2017/044490, filed Jul. 28, 2017, Written Opinion of the International Searching Authority dated Nov. 7, 2017 (9 pgs.).
Ogue, Juan Carlos et al.; "A Fast Convergence Frequency Domain Adaptive Filter"; IEEE Transactions on Acoustics, Speech, and Signal Processing; vol. ASSP-31; No. 5; Oct. 1983; pp. 1312-1314.

* cited by examiner

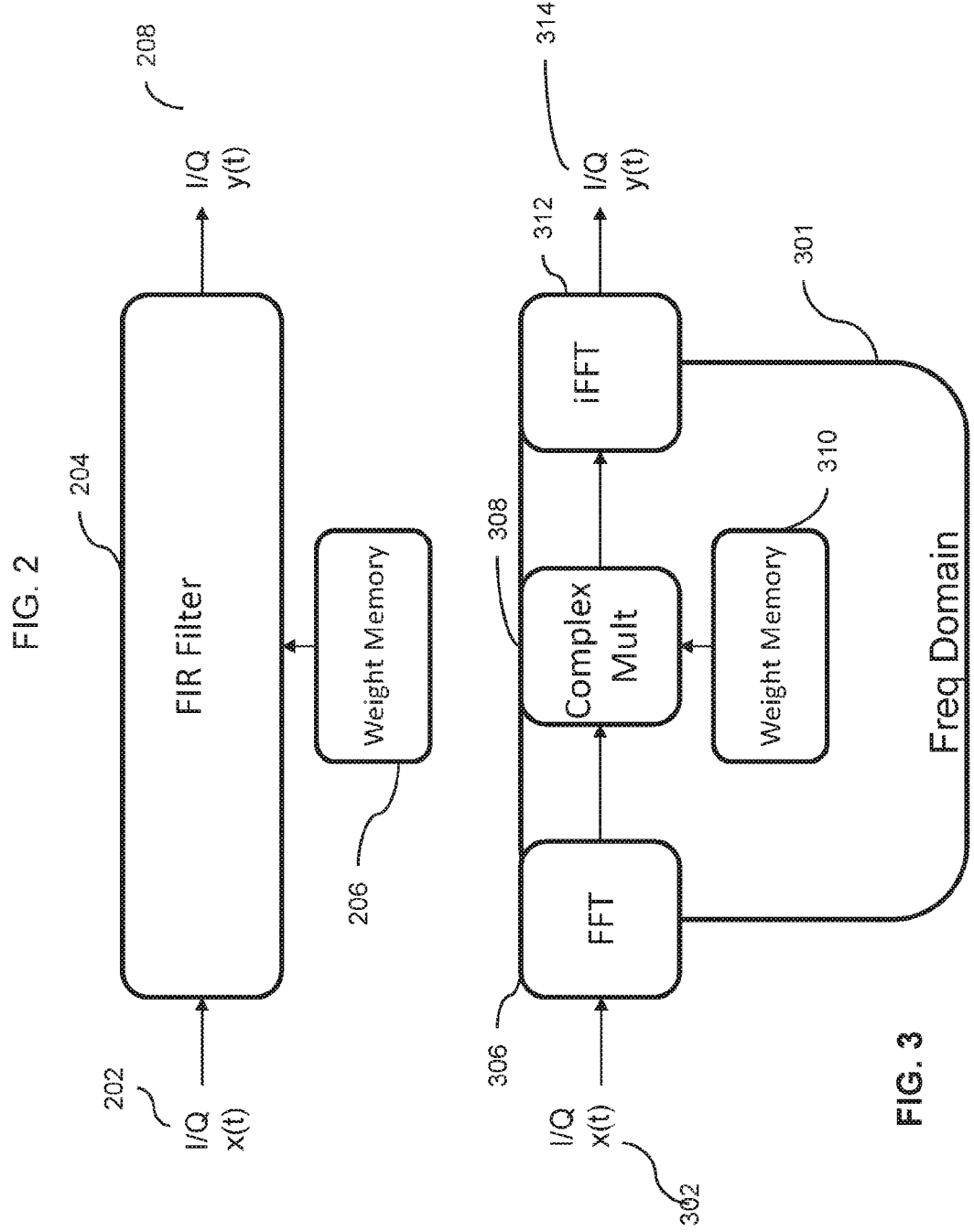

SYSTEM AND METHOD FOR ADAPTIVE SIMULTANEOUS TRANSMIT AND RECEIVE LEAKAGE CANCELLATION

FIELD OF THE INVENTION

The disclosed invention relates generally to electronic circuits and more specifically to system and method for simultaneous cancellation of leakage current.

BACKGROUND

A typical RF system, for example a radar system capable of simultaneous transmission and receiving simultaneous transmit and receive radar ("STAR"), includes a transmitter for transmitting, for example, pulse modulated waves at a variety of different frequencies. A duplexer is coupled to the output of the transmitter to allow for bi-directional communication over a single path. A receiver is also coupled to the output of the duplexer for receiving the transmitted signals at the same time intervals as the frequencies of the transmitted signals. The duplexer isolates the receiver from the transmitter while permitting them to share a common antenna. Accordingly, the duplexer needs to operate in the frequency band used by the receiver and transmitter, provide adequate rejection of transmitter noise occurring at the receiver, operate at or less than the frequency separation between the transmitter and receiver, and prevent receiver desensitization.

However, transmit leakage (RF current and/or voltage) signal through isolation and antenna port reflection paths and mutual coupling from adjacent antenna elements in a phased array radar overloads the receive path generating noise in the RF receiver, resulting in inaccurate readings. This leakage or feedthrough signal comprises an unpropagated portion of the transmitted energy which is fed directly to the RF receiver resulting in saturation of and therefore degradation of the receiver.

In many cases, the received signal may include a leakage component when the transmit signal is reflected from non-target objects and the receiver receives a portion of the bounced transmit-signal, or when the receiver receives a portion of the transmit signal directly from the transmitter.

In order to cancel the leakage signal in the radio frequency (RF) path for a simultaneous transmit and receive application, filter coefficients must be calculated in real time and a cancellation signal must be adapted in real-time based on those coefficients to allow better cancellation. Also in order to meet radar specifications, very small latency is allowed on the adaptive filtering for the transmit line.

Some current techniques perform the cancellation via an analog feedback. However, the problem with the analog feedback is that the analog circuitry adds additional distortion to the cancellation signal which needs to be subsequently adapted out of the system. Fast digital control of the adaptive algorithm is not possible, and analog coefficients must often be calculated off line. In general, the slower the adaptive loop of the process, the less cancellation the process can achieve, because the change rate of the signal to which the system is adapting dictates the cancellation that can be achieved. For example, if the signal is changing significantly faster than the adaptive loop, cancellation is limited. Moreover, off-line computation of coefficients is not adaptive at all and does not address dynamic signals or dynamic environments well.

In general, current techniques to achieve a leakage cancellation are based on three basic methods: i) the cancellation is done in the analog domain where the equalization filter is applied in analog with a tapped delay line mechanism on the transmitted signal and the resulting delayed and amplitude equalized version of the transmitted signal, or cancellation signal with an inverse of the leakage content inside the received signal, is added to the received signal; ii) the cancellation is done in the analog domain where cancellation signal is created in the digital domain by passing the transmit waveform through the equalization filter and sent to a digital to analog converter to be added to the received signal to cancel the leakage in the analog domain; or iii) the cancellation is done in the digital domain where the equalization filter is applied in the digital domain on the transmitted waveform, and the digital cancellation signal and digital received signal are combined in the digital domain. However, all of these approaches suffer from two limitations. The first is that they typically need to accommodate several sampling rates, which complicates the system design. The second is that they produce undesirably large delays, which makes them unsuitable for certain high-speed (and real-time) applications. Large delays in the leakage cancellation signal results in substantial "blind spots" in certain radar applications, due to slower generation of adaptive parameters slower adaptations of the filter coefficients.

SUMMARY

In some embodiments, the disclosed invention is a method for leakage signal cancellation in a simultaneous transmit and receive RF system. The method includes: generating a digital transmit signal for transmission from the system; receiving a receive signal produced by reflection of the transmit signal from an object or generated by a second RF system; adaptively filtering the transmit signal by an adaptive finite input response (FIR) filter; calculating filter coefficients for the adaptive FIR filter in real-time at a different sampling rate; adaptively inputting the calculated filter coefficients to the adaptive FIR filter to generate a cancellation signal in real-time; and applying the cancellation signal to the receive signal to cancel leakage in the receive signal to generate an optimum receive signal. The filter coefficients are calculated by down-sampling the transmit signal and the optimum receive signal and processing the down-sampled signals to calculate the filter coefficients in real-time.

In some embodiments, the disclosed invention is an apparatus for leakage signal cancellation in a simultaneous transmit and receive RF system. The apparatus includes: a digital waveform generator for generating a digital transmit signal for transmission from the system; a receiver for receiving a receive signal produced by reflection of the transmit signal from an object or generated by a second RF system; an adaptive finite input response (FIR) filter for adaptively filtering the transmit signal; a frequency domain adaptive filter (FDAF) circuit for calculating filter coefficients for the adaptive FIR filter in real-time and adaptively inputting the calculated filter coefficients to the FIR filter to generate a cancellation signal in real-time; an adder for adding the cancellation signal to the receive signal to cancel leakage in the receive signal and generate an optimum receive signal; a first down-sampler for down-sampling the transmit signal and inputting the down-sample transmit signal to the FDAF circuit; and a second down-sampler for down-sampling the optimum receive signal and inputting the down-sample optimum receive signal to the FDAF circuit. The FDAF circuit processes the down-sampled signals to calculate the filter coefficients in real-time.

The processing of the down-sampled signals may include calculating a next filter coefficient in real-time as a function of a current filter coefficient, a frequency domain cancellation signal and a complex conjugate of a frequency domain of the down-sampled transmit signal, using least squares method, or other known methods.

Adaptive filtering of the transmit signal may be performed in time domain, or frequency domain.

BRIEF DESCRIPTION OF THE DRAWINGS

These and other features, aspects, and advantages of the disclosed invention will become better understood with regard to the following description, appended claims, and accompanying drawings.

FIG. 2 is a simplified exemplary block diagram of a time-based super-sample FIR filter, according to some embodiments of the disclosed invention.

FIG. 3 is a simplified exemplary block diagram of an exemplary frequency-based circuit implementing a leakage cancellation transfer function, according to some embodiments of the disclosed invention.

DETAILED DESCRIPTION

Figure 1:
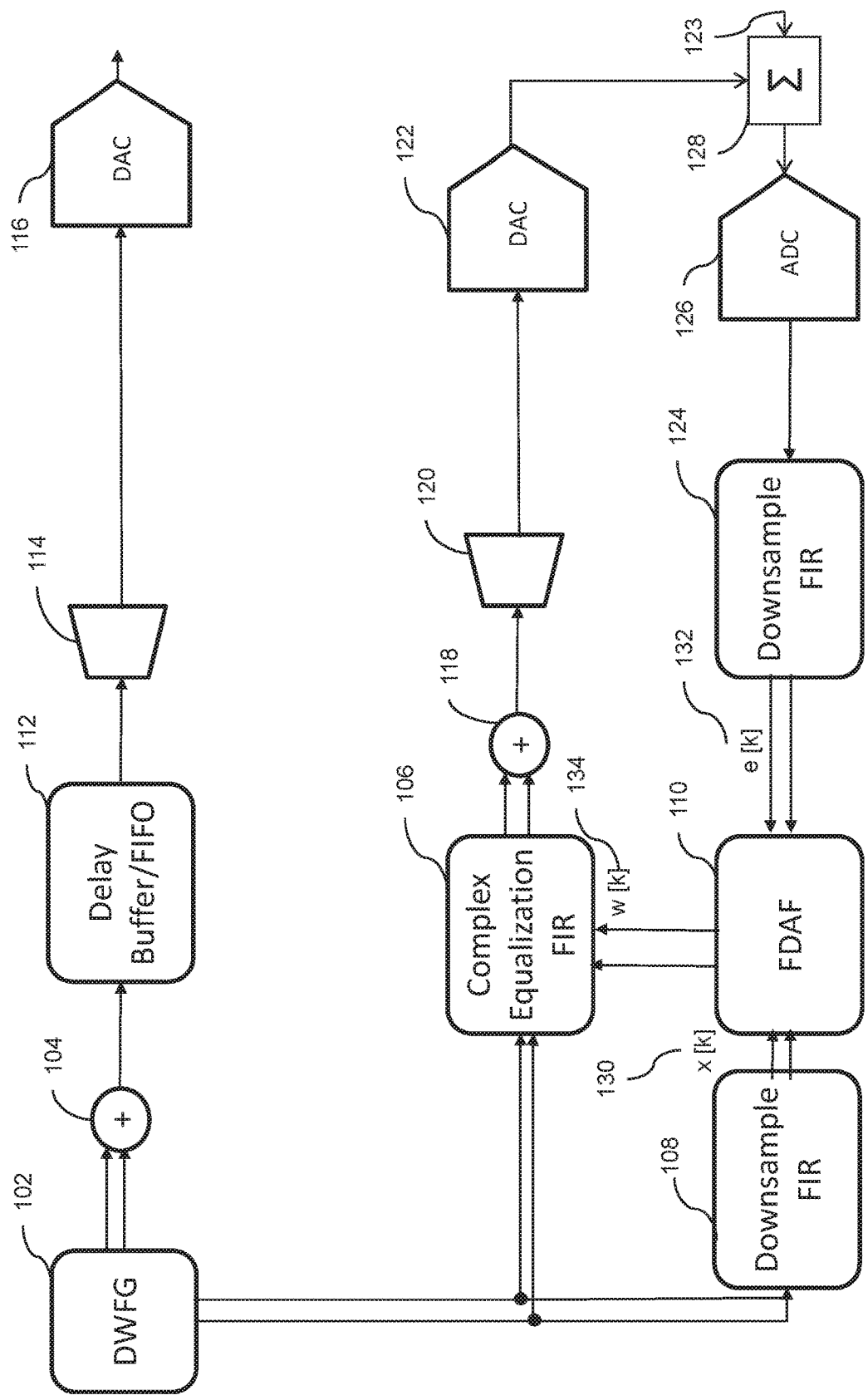
FIG. 1 is a simplified exemplary block diagram of a system including a super sampled adaptive finite impulse response (FIR) filter for generating a leakage cancellation signal, according to some embodiments of the disclosed invention.

In some embodiments, the disclosed invention utilizes a super sampled adaptive finite impulse response (FIR) filter that achieves the desired leakage cancellation signal based on digitized feedback with minimum latency. A frequency domain adaptive filter (FDAF) is used to calculate the filter coefficients. In some embodiments, the FDAF is integrated into the super sampled architecture. In some embodiments, the FDAF is in a cancellation loop with a low latency super sampled FIR filter achieving cancellation using digital intermediate frequency (IF) feedback.

In some embodiments, the disclosed invention is a simultaneous transmit and receive RF system, for example, a STAR that generates a leakage cancellation signal from the transmit signal in real time where a small cancellation delay through the cancellation architecture is required. This results in a small delay through the transfer function to generate the transmitted digital cancellation signal.

In some embodiments, the disclosed invention is a digital system that generates a cancellation signal by adaptive computation of super sampled versions of a digital FIR equalization weights in real-time. The disclosed invention applies the super sampled weights to a digital cancellation FIR to generate a separation of the computation of adaptive parameters and applies the weights to the filter at different rates.

Many simultaneous digital transmit and receive architectures include signals of multiple frequencies. For example, a digital to analog converter (DAC) transmits signals at one frequency $F_{DAC}$, an analog to digital converter (ADC) digitizes incoming signals at another frequency, $F_{ADC}$, a field programmable gate array (FPGA) generates a clock frequency $F_{CLK}$; and an effective sampling rate of the system may be at a different frequency $F_{SYSTEM}$. In wideband systems, the $F_{ADC}$ and $F_{DAC}$ are typically much greater than the $F_{CLK}$, because FPGA clocks are limited to the 100s of MHz, whereas the signals of the ADCs and DACs are typically at GHz rates. However, because the signal carrier information resides in a narrow band, and to save FPGA resources, an incoming ADC signal is typically down converted and rate-changed to a lower sampling rate to match the FPGA rates. Similarly when the FPGA digitally generates a transmit signal to save resources, the signal is typically generated at one rate and up converted and rate changed for transmission.

In some architectures, there may be a wideband transmit DAC, but a more narrowband ADC, such that $F_{DAC}>F_{ADC}$. In this case a smaller $F_{ADC}$ frequency is desired since $F_{ADC}$ is correlated with the size, weight and price (SWAP) of the ADC. As a result, if multiple receive channels are desired to save SWAP, a smaller $F_{ADC}$ is used. In some embodiments of the disclosed invention, $F_{SYSTEM}>F_{CLK}$ so that the latency through an FIR filter, which effectively operates at $F_{SYSTEM}$ is much lower than the rate at which the FIR filter might have operated. In some embodiments, $F_{ADC}<F_{SYSTEM}$ so that the data sampled from $F_{ADC}$ is changed to a different rate to be processed through the FIR filter, which operates at $F_{SYSTEM}$ Therefore, when $F_{ADC}<F_{SYSTEM}$, this results in a digital cancellation signal with small latency. As one skilled in the art would recognize, "real-time" in the context of signal processing means a system (or circuit) which controls an environment or function by receiving data, processing the data, and returning the results sufficiently quickly to affect the environment at that time without significant delay. Also, one skilled in the art would understand that "real-time" in the context of data processing means data processing that appears to take place, or actually takes place, sufficiently instantaneously upon data entry or receipt of a command.

FIG. 1 is a simplified exemplary block diagram of a system including a super sampled adaptive finite impulse response (FIR) filter for generating a leakage cancellation signal, according to some embodiments of the disclosed invention. As shown, a digital waveform generator circuit (DWFG) 102 generates digital samples for an RF signal, for example, transmit signal of a STAR system. In some embodiments, the DWFG 102 is comprised of a direct digital synthesizer (DDS), which reads successive values from a lookup table made of the values of, for example, a sinewave. In some embodiments, this waveform is produced as N parallel polyphased lanes such that the data can be produced with a clock rate of 1/N the sampling rate of the waveform. In some embodiments, the data generated from the DWFG 102 is complex data and thus an optional summer 104 may be used to reformat the data to real data. A delay or buffer FIFO 112 controls the number of delayed clock cycles the waveform may take to get through a transmit path. This is typically performed to align the waveforms in different paths.

In some embodiments, a clock domain crossing circuit 114 increases the clock rate by reducing the number of parallel data paths. For example, the clock domain crossing circuit 114 may double the clock rate in the device and reduce the number of parallel data paths by half, before the data is input to and transmitted out of a first digital to analog converter (DAC) 116. The output of this DAC is an analog signal and constitute the RF transmit signal. The waveform from DWFG 102 is also transmitted along multiple paths, such as a second path through a complex equalization FIR filter 106. The equalization FIR filter 106 applies a transfer function calculated to allow cancellation. An optional adder 118 reformats the signal from a complex signal to a real signal.

Although, the equalization FIR filter 106 also works in real domain, it works more effectively in the complex domain since amplitude and phase can be equalized simultaneously with a complex FIR. The number of polyphaser lanes (paths) of this equalized cancellation (real) signal is decreased and the clock rate of each polyphaser lane is increased by a clock domain crossing circuit 120 and then transmitted to a second DAC 122. In these embodiments, the clock domain rate update is performed, because typically external I/O signals are low voltage differential signals (LVDS) which are run at a double data rate (DDR) so that the total data throughput per lane is typically 500 MHz in some embodiments. Accordingly, data needs to be fed into a LVDS driver at a 500 MHz rate. This is typically accomplished with 2 lanes at 250 MHz or 4 lanes at 125 MHz, so when the data is input to a LVDS buffer, a clock domain crossing circuit is also used.

The cancellation signal, output from the second DAC 122, is summed with an incoming receive analog signal 123 by a summer/adder circuit 128. This summation results in leakage cancellation such that ideally the output signal of the summer/adder 128 going into an analog to digital converter (ADC) 126 does not contain the leakage signal (optimum receive signal). This signal is considered the "error" signal, because it contains the remnants of a non-perfect cancellation. The output signal from ADC 126 is often at a high sample rate and therefore may be down converted and down-sampled by a down-sampler FIR 124 and processed to compute the equalization coefficients for the equalization FIR filter 106, by a frequency domain adaptive filter (FDAF) circuit 110.

In some embodiments, the FDAF circuit 110 takes in the error signal from the down-sampler FIR 124, and the transmitted signal from the DWFG 102 that is down-sampled by a down-sampler FIR 108, to compute the FIR coefficients necessary to transform the signal from the DWFG 102 into a signal that can be used to cancel the leakage signal coming from an RF system, where the cancellation occurs at the summer/adder 128. This way, the system includes a feedback through the loop of the complex equalization FIR filter 106, the second DAC 122, the summer/adder 128, back into the ADC 126 and down-sampled by the down-sampler FIR 124, to compute and feed the filter coefficients back to the equalization FIR filter 106. Here, the input signal to the FDAF circuit is called x[k] (13) and the error signal is called e[k] (132), which are used to compute the weight coefficients w[k] (134). In some embodiments, the output of the FDAF circuit may be up-converted (up-sampled) by an up-sampler circuit (not shown) to a higher rate closer to the rate that the complex equalization FIR filter 106 operates at. In some embodiments, the output of the FDAF circuit (with or without up-sampling) may be input to a weight memory, such as a read access memory RAM, read only memory (ROM), FIFO buffer, and the like, similar to those in FIGS. 2-5 (206, 310, 408 and 506, respectively).

An exemplary fast convergence method for adaptive digital filters is described in J. Carlos Ogue, T Saito and Y. Hoshiko, "A fast convergence frequency domain Adaptive Filter," IEEE Trans. Acoustics, speech, and signal processing, Vol. ASSP-31, No. 5, pp. 1312-1314, October 1983 ("Fast Adaptive Filter paper"), the entire content of which is hereby expressly incorporated by reference. In this example, since the filter is implemented in the frequency domain and the input signals are stationary, each of the frequency bins may be independently adapted by a self-normalizing gradient approach.

Another exemplary method for adaptively generating coefficient's for a digital FIR filter is the least squares method. This known method approximates the solution of overdetermined systems, in which there are more equations than unknowns. The overall solution of the method minimizes the sum of the squares of the errors made in the results of every single equation. The least squares method is used in data fitting, in which the best fit in the least-squares sense minimizes the sum of squared residuals, a residual being the difference between an observed value and the fitted value provided by a model.

The electronic circuits of the disclosed invention may be implemented by a digital signal processor (DSP), very large scale integrated circuit (VLSI), application specific integrated circuit (ASIC), field-programming gate array (FPGA), or any other electronic circuit technologies suitable for RF circuits.

FIG. 2 is a simplified exemplary block diagram of a time-based super-sample FIR filter according to some embodiments of the disclosed invention. As shown, the cancellation signal is applied in the time domain, in these embodiments. In some embodiments, a complex I/Q signal 202 is input into an equalization FIR filter 204. Coefficients or weights are computed in real-time or may be stored ahead of time in and retrieved from a weight memory 206, such as a read access memory RAM, read only memory (ROM), FIFO buffer, and the like. In the latter case, the weight memory would provide the weights to a complex equalization FIR, for example, the complex equalization FIR filter 106 of FIG. 1. The coefficients are then provided to the time domain equalization FIR filter 204 such that a transfer function is applied to the input signal 202, which generates an equalized output signal 208.

In some embodiments, the equalization FIR filter 204 modulates the input signal for generate a signal that is a replica of the signal that is desired to be cancelled. The closer the cancellation signal is to the signal desired to be cancel, the deeper (e.g., smaller signal residual amplitude) the cancellation (error signal) that is created. As a result, the output y(t) of the equalization FIR filter 204 is the signal, or model of the signal, desired to be cancelled. The input x(t) to the equalization FIR filter 204 is the signal (waveform) originating from the system, in this case, the waveform from the digital waveform generator. The equalization FIR filter 204 implements a transfer function h(t) to generate the cancellation signal. The output of the equalization FIR filter 204 is the convolution of this transfer function implemented by the equalization FIR filter 204 with the input signal, given by y(t)=h(t)*x(t).

The transfer function h(t) is often easier to compute using Fourier domain methods in the frequency domain, where H(f) is the frequency domain representation of the time domain transfer function h(t). Since convolution is implemented as multiplication in the frequency domain, Y(f)=H(f)*X(f), or H(f)=Y(f)/X(f). It follows then h(t)=Inverse Fourier Transform (IFT) of H(f). This is equivalent to the inverse Fourier transform of the Fourier transform of the leakage signal divided by the Fourier transform of the generated input signal, i.e., the DWFG signal. The coefficients of the transfer function h(t) are computed and maybe stored in a weight memory 206 to implement the transfer function in the time domain. In some embodiments, this equalized output signal 208 is a complex baseband FQ signal. For example, in FIG. 1, the complex baseband I/Q signals may be output from the complex equalization FIR filter 106, if the computation was performed at a complex baseband. The coefficients from FDAF 110 are also provided to the complex equalization FIR filter 106.

FIG. 3 is a simplified exemplary block diagram of an exemplary frequency-based circuit implementing a leakage cancellation transfer function, according to some embodiments of the disclosed invention. FIG. 3 provides an example of a cancellation circuit where the transfer function coefficients are applied in the frequency domain. As shown, a time domain input signal 302 is fast Fourier transformed (FFT) by an FFT circuit 306 into a frequency domain representation. The frequency domain signal is then multiplied by the coefficients representing the transfer function using a multiplier 308. If the input signal 302 is a complex signal, then the multiplier 308 performs a complex multiplication. The coefficients are provided by a weight memory 310, in frequency domain. The multiplication results (output of the multiplier 308) is then inverse Fourier transformed (iFFT) by an iFFT circuit 312 back into a time domain output 314. This circuit combination of an FFT circuit 306, a multiplier 308 and an iFFT circuit 312 may be more computationally efficient than an FIR filter implementation of FIG. 2.

Figure 4:
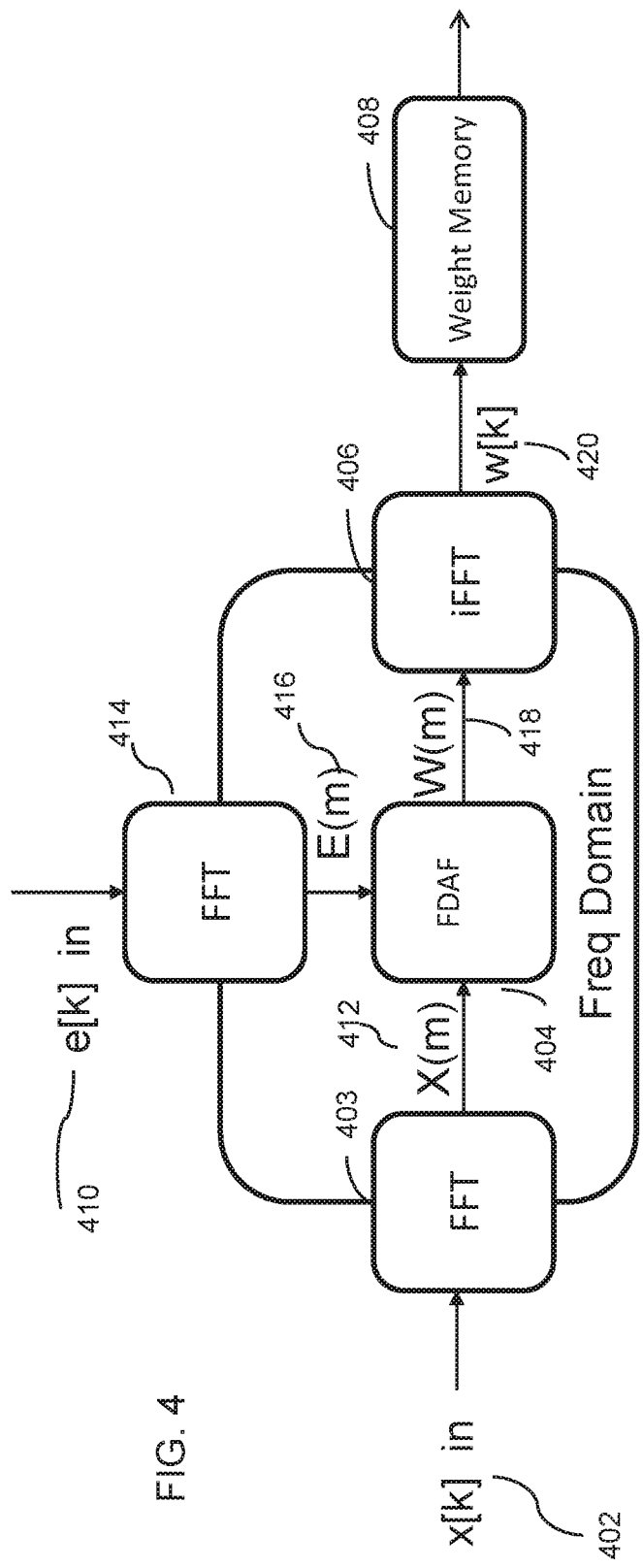
FIG. 4 is a simplified exemplary block diagram of a frequency domain adaptive filter (FDAF) for computation of time domain coefficients for a time-based super-sample FIR filter, according to some embodiments of the disclosed invention.
Figure 5:
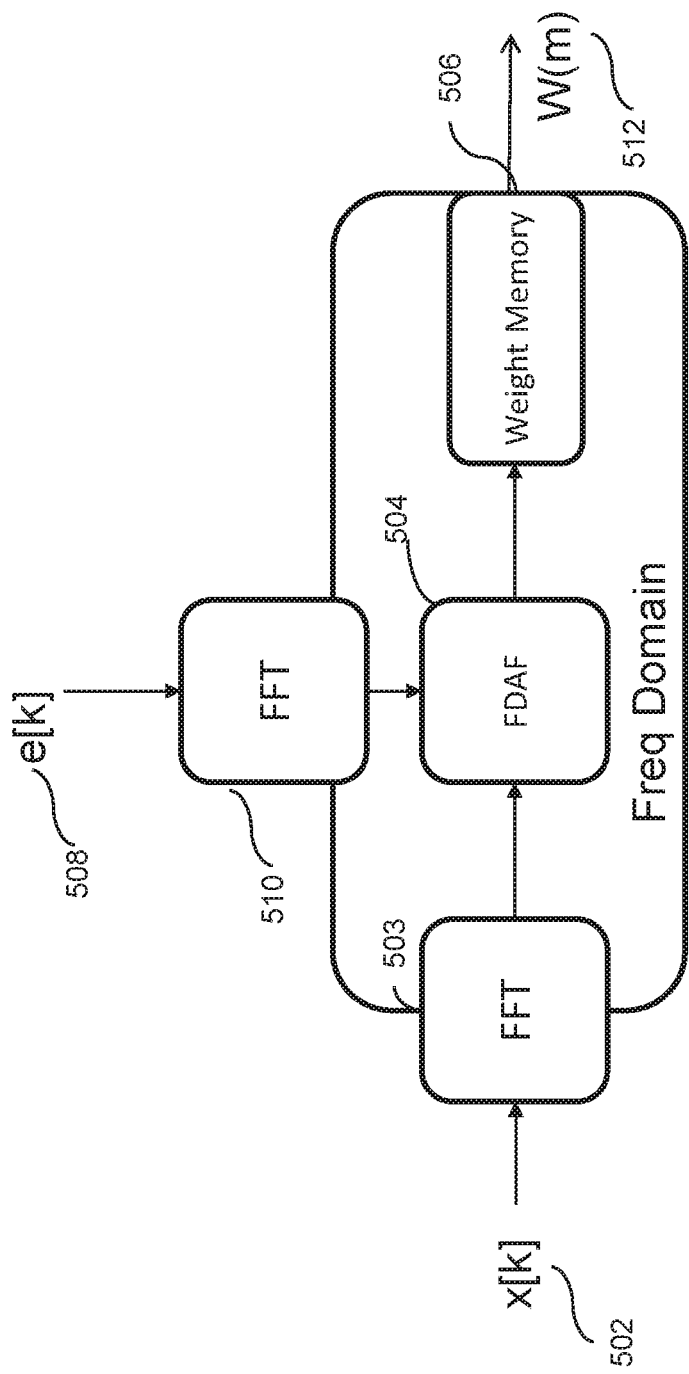
FIG. 5 is a simplified exemplary block diagram of a frequency domain adaptive filter (FDAF) for a frequency-based super-sample FIR filter, according to some embodiments of the disclosed invention.

Note that the functionality of the FFT circuit 306, the multiplier 308 and the iFFT 312 represent a mathematically equivalent function to an FIR filter, such as the one in FIG. 2, with time domain representation of coefficients. A computational efficiency is realized, because a convolution operation can be implemented as a multiplication operation in the time domain. As a result, for some embodiments, the difference in computational complexity between convolution and multiplication operations justifies for use of the FFT and iFFT circuits to operate in the frequency domain. FIGS. 4 and 5 provide a more detailed explanation of how the weights are calculated to be stored in a memory or buffer.

FIG. 4 is a simplified exemplary block diagram of a frequency domain adaptive filter (FDAF) for computation of time domain coefficients for a time-based super-sample FIR filter, according to some embodiments of the disclosed invention. FIG. 4 illustrates a process and circuit in which coefficients (weights) are computed for a cancellation FIR filter. As shown, an input signal x[k] 402, which is a time domain I/Q signal from a digital waveform generator (DWFG) (an a down-sample FIR, such as 108 in FIG. 1, is Fourier transformed by an FFT circuit 403 to create a frequency domain version of the input signal, that is X(m) 412, which is then input to an FDAF circuit 404. Also an error signal e[k] 410 (such as that from a down-sampler FIR 124 in FIG. 1) is also Fourier transformed by an FFT circuit 414 to create a frequency domain version of the error signal, E(m) 416, which is also input to the FDAF circuit 404.

In some embodiments, the cancellation weights are calculated by the FDAF circuit 404 producing weights W(m) 418, in the frequency domain. In some embodiments, the cancellation weights are calculated according to the method explained in the Fast Adaptive Filter paper, the least squares methods, or the like, using digital circuits to implement such methods. In some embodiments, the FDAF weight update equation is as follows:

Next weight, $W(m+1)=W(m)+P(m)\cdot X^*(m)\cdot E(m)$, where E(m) is the frequency domain error signal 416, X*(m) is the complex conjugate of the frequency domain input signal X(m) (the down-sampled transmit signal), and P(m) is a variable coefficient that controls the convergence rate. In some embodiments, P(m)=1. In some embodiments, $P(m)=[\sum_{i=1}^{m} X^*(i)X(i)]^{-1}$, or the inverse of the sum of the first m instances of the input times the complex conjugate of the input. This relation can be readily implemented with digital addition and multiplication circuits, for example using FPGAs or VLSI technologies. The frequency domain weight output W(m) 418 is then inverse Fourier transformed to create a time domain weight output w[k] 420. The coefficients (weights) are then provided to a time domain cancellation FIR filter, such as 204 in FIG. 2. The weights may also be provided to a weight memory and then provided to the time domain cancellation FIR filter.

FIG. 5 is a simplified exemplary block diagram of a FDAF for a frequency-based super-sample FIR filter, according to some embodiments of the disclosed invention. FIG. 5 shows embodiments, in which coefficients (weights) can be computed for a cancellation FIR in the frequency domain, such as the frequency-based super-sample FIR filter 301 in FIG. 3. An input signal x[k] 502 is transformed through a FFT circuit 503 and processed to compute coefficients (weights) by a FDAF circuit 504 with the error input signal e[k] 508, which is itself Fourier transformed by a FFT circuit 510. The Fourier domain weighted output, W(m) 512, is computed in the same way as that in FIG. 4, except in this case, the frequency domain weight signal W(m) is not inverse Fourier transformed and left in the frequency domain. In some embodiments, the input signal 502 may be a complex baseband I/Q signal. The coefficients (weights) may be output to a weight memory 506 to be applied to a frequency domain cancellation FIR, such as that depicted in FIG. 3.

Figure 6:
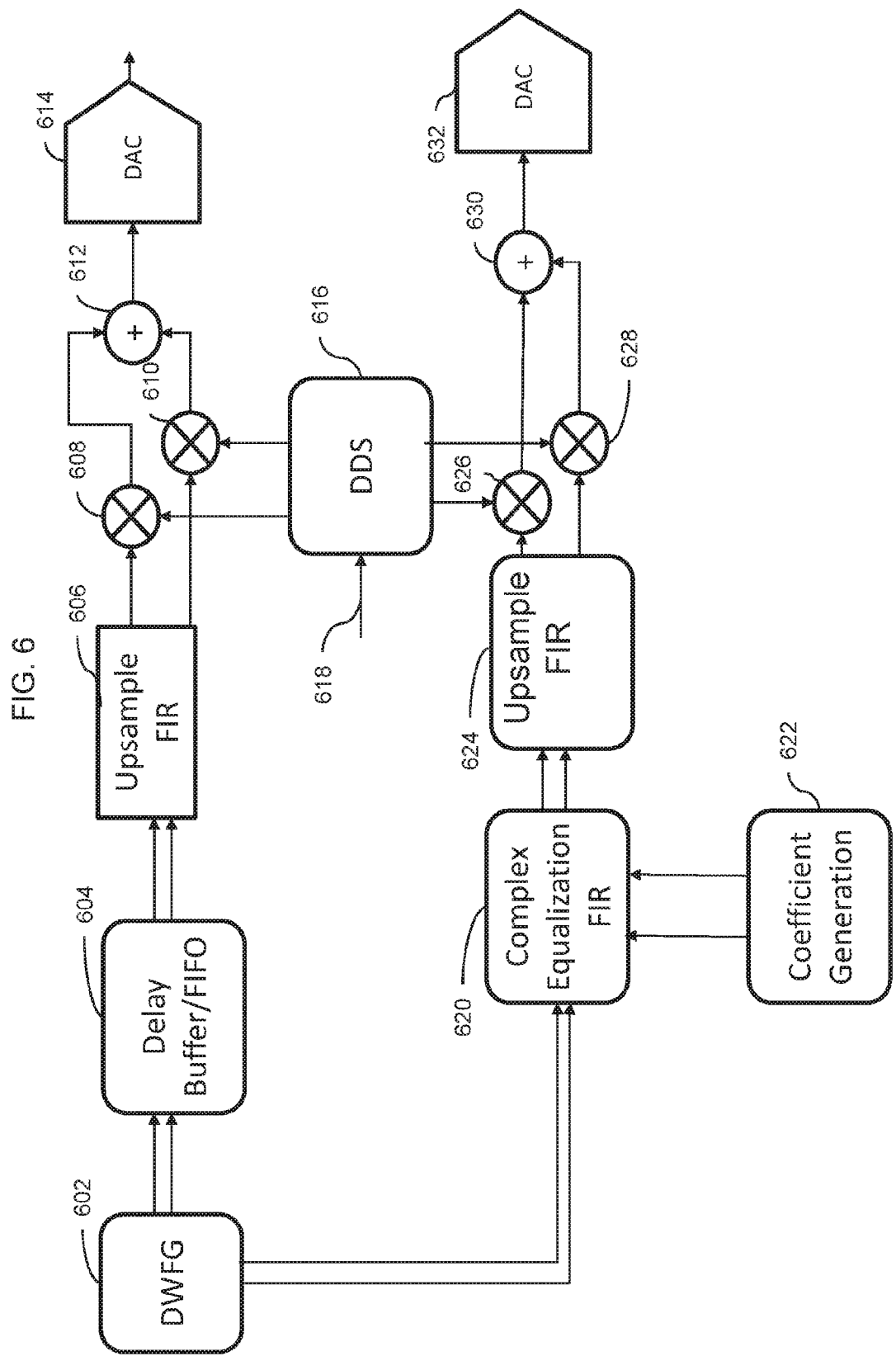
FIG. 6 is a simplified exemplary block diagram of a system including a super sampled adaptive finite impulse response (FIR) filter for generating a leakage cancellation signal, according to some embodiments of the disclosed invention.

FIG. 6 is a simplified exemplary block diagram of a system including a super sampled adaptive FIR filter for generating a leakage cancellation signal, according to some embodiments of the disclosed invention. FIG. 6 shows an embodiment of a digital cancellation path. As shown, a digital waveform generator (DWFG) 602 produces a digitally synthesized waveform and outputs it to a delay buffer/FIFO 604 to time align the waveform with other signal paths. For example, in the example of FIG. 1, first signal path would be the signal path from the digital waveform generator 102 through the adder 104, FIFO 114 and DAC 116. A second signal path would be the signal path from digital waveform generator 102 through the FIR filter 106, adder 118, time domain change 120 and DAC 122. The output of the delay buffer/FIFO 604 is up-sampled by an up-sample FIR 606, and digitally mixed to an intermediate frequency (IF) by digital mixer 608 for the I signal and digital mixer 610 for the Q signal. The I and Q signals are then added together by a digital adder 612 to convert from a complex format to a real format. The output of the digital adder 612 is then converted to an analog signal form transmission by a first DAC 614. This method and circuit to up-sample and digitally mix an input signal is an alternative to transform a digital transmit signal to higher sample rates of IF, as compared to FIG. 1, which shows a method and circuit to create a highly sampled signal directly with a DWFG by creating few parallel polyphased paths.

The DWFG 602 also transmits the digitally synthesized waveform to a complex equalization (cancellation) FIR 620, the coefficients of which are calculated by a coefficient generation circuit 622. The equalization uses the coefficients by applying a transfer function to allow for the cancellation. The coefficients are precomputed and stored in a memory (in place of the coefficient generation circuit 622), or calculated by the coefficient generation circuit 622 using an adaptive process, such as the FDAF process described above, or by a well-known least squares methodology. The resulting signal is then up-sampled and digitally mixed by an up-sampler FIR 624, mixers 626 and 628, one for the I signal and the other for the Q signal and an adder 630 to create an IF signal, which is input to a second DAC 632. A direct digital synthesizer (DDS) 618 with a reference clock signal 618 is used as a digital oscillator to create the appropriate IF signal. As known in the art, a DDS is a type of frequency synthesizer used for creating arbitrary waveforms from a single, fixed-frequency reference clock. The signal output from the DAC 614 is the transmitted signal that is transmitted through the RF system and out in the environment. The signal output from the DAC 632 is the cancellation signal to be added to the received signal in the analog domain(similar to FIG. 1) to perform the cancellation.

In some embodiments, the system depicted in FIG. 6 includes the lower signal path of FIG. 1, that is, components similar to the adder 128, down-sampler 124 and down-sampler 108 of FIG. 1 to provide down-sampled signals to the coefficient generation circuit 622. However, the difference between FIG. 1 and FIG. 6 is the circuit (and method) used to generate data at a high enough sample rate to be transmitted out of the DAC 116 in FIG. 1 and DAC and 614 in FIG. 6. In FIG. 1, the architecture is a super-sampled architecture where the modules in the transmit paths such as DWFG 102 and the equalization FIR filter 106 generate data in parallel (e.g., by DDSs) such that the effective sample rate of the data generated is greater than that of the system clock rate, such as the effective sampling rate of the DAC 116. For example if the system clock is at 100 MHz and the DAC 116 is clocked at 1 GHz, there would be 10 parallel paths such that DWFG 102 and the equalization FIR filter 106 would also have an effective clock rate of 1 GHz. On the other hand, in FIG. 6, the modules in the transmit paths such as DWFG 602 and the equalization FIR filter 620 are clocked at a clock rate of 100 MHz, with a single path for an effective clock rate of 100 MHz. The data in the transmit paths are then up-sampled through up-sample FIRs 606 and 624 and digitally up converted through 608, 610, 626, and 628 to meet the DAC 614 rates, such as 1 GHz for example. The Cancellation process works similar to that of FIG. 1.

Figure 7:
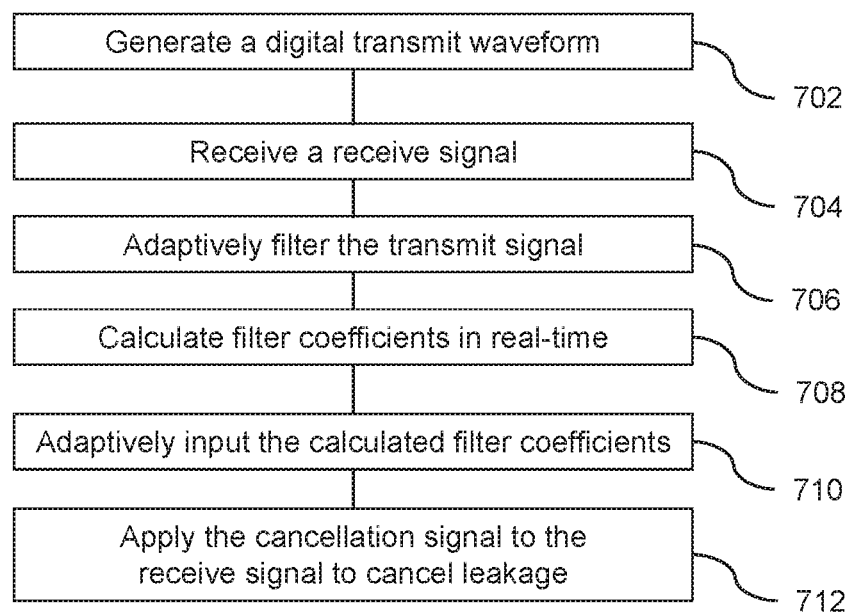
FIG. 7 is a simplified process flow for generating a leakage cancellation signal, according to some embodiments of the disclosed invention.

FIG. 7 is a simplified process flow for leakage signal cancellation in a simultaneous transmit and receive system, according to some embodiments of the disclosed invention. As shown in block 702, a digital transmit waveform is generated for transmission from the system, such as a STAR system. In block 704, a receive signal, which may be produced by reflection of the transmit waveform from an object or generated by a second RF system, is received. Typically, this receive signal includes a leakage component (RF current and/or voltage) through reflection paths and mutual coupling from adjacent elements resulting in inaccurate readings. In block 706, the transmit signal is adaptively filtered by an adaptive FIR filter. The filter coefficients for the adaptive FIR filter are calculated in real-time in block 708, and adaptively input to the FIR filter to generate a cancellation signal in real-time, in block 710. In block 712, the cancellation signal is applied to the receive signal to cancel the leakage component in the receive signal and generate an optimum receive signal. In some embodiments, the filter coefficients are calculated by down-sampling the transmit signal and the optimum receive signal and processing the down-sampled signals to calculate the filter coefficients in real-time.

In some embodiments, the cancellation weights are calculated according to the method explained in the Fast Adaptive Filter paper, the least squares methods, or the like. In some embodiments, the processing is performed by a weight update process as a function of the current weight, the frequency domain error signal and the complex conjugate of the frequency domain input signal, such as:

Next weight $W(m+1)=W(m)+P(m)\cdot X^*(m)\cdot E(m)$, where $E(m)$ is the frequency domain error signal, $X^*(m)$ is the complex conjugate of the frequency domain input signal $X(m)$, and $P(m)$ is a variable coefficient that controls the convergence rate. In some embodiments, $P(m) =1$. In some embodiments, $P(m)=[\Sigma_{i=1}^{m} X^*(i)X(i)]^{-1}$, or the inverse of the sum of the first m instances of the input times the complex conjugate of the input. The adaptive FIR filter operates in a time domain, or in a frequency domain.

It will be recognized by those skilled in the related fields that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for leakage signal cancellation in a simultaneous transmit and receive RF system, the method comprising:
    generating a digital transmit signal;
    delaying the digital transmit signal by a FIFO to control the number of delayed clock cycles of the digital transmit signal;
    converting the delayed digital signal to an analog transmit signal and transmitting the analog transmit signal from the system;
    receiving a receive signal produced by reflection of the analog transmit signal from an object or generated by a second RF system;
    adaptively filtering the digital transmit signal by an adaptive finite input response (FIR) filter;
    converting a digital output signal of the adaptive FIR filter to analog domain to generate an analog cancellation signal;
    calculating filter coefficients for the adaptive FIR filter in real-time;
    adaptively inputting the calculated filter coefficients to the adaptive FIR filter;
    adding the analog cancellation signal to the receive signal to generate an analog error signal for cancelling leakage in the receive signal;
    converting the analog error signal to a digital error signal; and
    using the digital error signal to calculate the filter coefficients for the adaptive FIR filter in real-time.

2. The method of claim 1, wherein said adaptively filtering the digital transmit signal is performed in a time domain.

3. The method of claim 1, wherein said adaptively filtering the digital transmit signal is performed in a frequency domain.

4. The method of claim 1, wherein said calculating the filter coefficients for the adaptive FIR filter comprises calculating a next filter coefficient in real-time as a function of a current filter coefficient, a frequency domain cancellation signal and a complex conjugate of a frequency domain of a down-sampled signal of the digital error signal.

5. The method of claim 4, wherein said next filter coefficient W(m+1) is computed as:

$$W(m+1)=W(m)+P(m)\cdot X^*(m)\cdot E(m),$$

where W(m) is the current filter coefficient, E(m) is the frequency domain cancellation signal, X*(m) is the complex conjugate of the frequency domain of the down-sampled transmit signal, and P(m) is a variable coefficient that controls a convergence rate.

6. The method of claim 4, wherein said calculating the filter coefficients for the adaptive FIR filter comprises using a least squares method for the down-sampled signal to calculate the filter coefficients in real-time.

7. The method of claim 1, further comprising up-sampling the calculated filter coefficients before inputting the calculated filter coefficients to the adaptive FIR filter.

8. The method of claim 1, further comprising increasing a clock rate of an output signal of the adaptive FIR filter by a clock domain crossing circuit and converting the output signal to an analog signal to generate the analog cancellation signal.

9. The method of claim 1, further comprising down-sampling the digital error signal before calculating the filter coefficients for the adaptive FIR filter.

10. An apparatus for leakage signal cancellation in a simultaneous transmit and receive RF system comprising:
a digital waveform generator for generating a digital transmit signal;
a FIFO for delaying the digital transmit signal to control the number of delayed clock cycles of the digital transmit signal;
a first digital-to-analog converter (DAC) for converting the delayed digital signal to an analog transmit signal and transmitting the analog transmit signal from the system;
a receiver for receiving a receive signal produced by reflection of the analog transmit signal from an object or generated by a second RF system;
an adaptive finite input response (FIR) filter for adaptively filtering the digital transmit signal;
a second digital-to-analog converter (DAC) for converting a digital output signal of the adaptive FIR filter to analog domain to generate an analog cancellation signal;
a frequency domain adaptive filter (FDAF) circuit for calculating filter coefficients for the adaptive FIR filter in real-time and adaptively inputting the calculated filter coefficients to the FIR filter;
an adder for adding the analog cancellation signal to the receive signal to generate an analog error signal for cancelling leakage in the receive;
an analog-to-digital converter (ADC) for converting the analog error signal to a digital error signal;
wherein the FDAF circuit uses the digital error signal to calculate the filter coefficients for the adaptive FIR filter in real-time.

11. The apparatus of claim 10, wherein said adaptive FIR filter operates in a time domain, or in a frequency domain.

12. The apparatus of claim 10, wherein the FDAF circuit calculates the filter coefficients for the adaptive FIR filter as a function of a current filter coefficient, a frequency domain cancellation signal and a complex conjugate of a frequency domain of a down-sampled signal of the digital error signal.

13. The apparatus of claim 12, wherein said next filter coefficient W(m+1) is computed by the FDAF circuit as:

$$W(m+1)=W(m)+P(m)\cdot X^*(m)\cdot E(m),$$

where W(m) is the current filter coefficient, E(m) is the frequency domain cancellation signal, X*(m) is the complex conjugate of the frequency domain of the down-sampled transmit signal, and P(m) is a variable coefficient that controls a convergence rate.

14. The apparatus of claim 10, wherein the FDAF circuit uses a least squares method for the down-sampled signals to calculate the filter coefficients in real-time.

15. The apparatus of claim 10, further comprising an up-sampling circuit for up-sampling the calculated filter coefficients before inputting the calculated filter coefficients to the adaptive FIR filter.

* * * * *